United States Patent
Zhang et al.

(10) Patent No.: US 10,979,127 B2
(45) Date of Patent: Apr. 13, 2021

(54) APPARATUS AND MECHANISM TO PERFORM BEAM MANAGEMENT AND BEAM FAILURE RECOVERY IN NR SYSTEM

(71) Applicant: MEDIATEK SINGAPORE PTE. LTD., Singapore (SG)

(72) Inventors: Yuanyuan Zhang, Beijing (CN); Chia-Hao Yu, Hsinchu (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 11 days.

(21) Appl. No.: 16/500,960

(22) PCT Filed: Aug. 10, 2018

(86) PCT No.: PCT/CN2018/099989
§ 371 (c)(1),
(2) Date: Oct. 4, 2019

(87) PCT Pub. No.: WO2019/029709
PCT Pub. Date: Feb. 14, 2019

(65) Prior Publication Data
US 2020/0036427 A1  Jan. 30, 2020

(30) Foreign Application Priority Data

Aug. 10, 2017 (WO) ............... PCT/CN2017/096807

(51) Int. Cl.
*H04B 7/06* (2006.01)
*H04W 76/27* (2018.01)
(Continued)

(52) U.S. Cl.
CPC .......... *H04B 7/0695* (2013.01); *H04W 16/28* (2013.01); *H04W 72/046* (2013.01);
(Continued)

(58) Field of Classification Search
CPC .. H04B 7/0695; H04B 7/2121; H04B 7/2123; H04W 76/27; H04W 16/28;
(Continued)

(56) References Cited

U.S. PATENT DOCUMENTS

2005/0037799 A1* 2/2005 Braun ................... H04W 16/28
                                                               455/525
2016/0353510 A1* 12/2016 Zhang ..................... H04L 43/16
(Continued)

FOREIGN PATENT DOCUMENTS

CN      1582043 A    2/2005
CN    106792775 A    5/2017
(Continued)

OTHER PUBLICATIONS

Liu, Jin, et al. "Initial access, mobility, and user-centric multi-beam operation in 5G new radio." IEEE Communications Magazine 56.3 (2018): 35-41. (Year: 2018).*
(Continued)

*Primary Examiner* — Sharad Rampuria
(74) *Attorney, Agent, or Firm* — Oblon, McClelland, Maier & Neustadt, L.L.P.

(57) ABSTRACT

An electronic device (110) includes a transceiver (130) and processing circuitry (150). The transceiver (130) can wirelessly receive a first (121) and a second signal (122 or 123) from an interface node (120) of a network work (101). The first signal (121) carries control information associated with a wireless link (105) between the electronic device (110) and the interface node (120). The processing circuitry (150) can obtain a first and a second signal quality of the first (121) and second signal (122 or 123) at a first protocol layer (PHY) in a protocol stack, respectively. At a second protocol layer (MAC), the processing circuitry (150) can determine whether the first signal (121) satisfies a beam failure crite-
(Continued)

rion based on the first signal quality, and identify the second signal (122 or 123) as a candidate beam when the second signal (122 or 123) satisfies a candidate beam criterion based on the second signal quality. The first protocol layer (PHY) can transmit a request for beam failure recovery (BFR), and monitor reception of a network response for the request.

18 Claims, 4 Drawing Sheets

(51) Int. Cl.
     *H04W 16/28*     (2009.01)
     *H04W 72/04*     (2009.01)
     *H04W 74/08*     (2009.01)
     *H04W 80/02*     (2009.01)

(52) U.S. Cl.
     CPC ....... *H04W 74/0833* (2013.01); *H04W 76/27* (2018.02); *H04W 80/02* (2013.01)

(58) Field of Classification Search
     CPC ........... H04W 72/046; H04W 74/0833; H04W 80/02; H04W 72/08; H04W 72/04; H04W 72/12; H04W 76/00; H04J 2203/0069; H04Q 2213/394
     See application file for complete search history.

(56) References Cited

U.S. PATENT DOCUMENTS

2018/0049055 A1* 2/2018 Wiberg ............... H04W 72/044
2018/0219604 A1    8/2018 Lu et al.

FOREIGN PATENT DOCUMENTS

| | | |
|---|---|---|
| CN | 106792776 A | 5/2017 |
| CN | 107005858 A | 8/2017 |
| WO | WO 2017/024516 A1 | 2/2017 |
| WO | WO 2017/068432 A1 | 4/2017 |

OTHER PUBLICATIONS

Combined Taiwanese Office Action and Search Report dated May 5, 2020 in Taiwanese Patent Application No. 108128252, 12 pages.
"RLM and RLF in HF NR", Media Tek Inc., 3GPP TSG-RAN WG2 Meeting #96, R2-168130, Nov. 14-18, 2016, 5 pages.
"Beam failure recovery design details", 3GPP TSG RAN WG1 Meeting #90bis, R1-1717302. Huawei, HiSilicon, Oct. 9-13, 2017, 7 pages.
International Search Report and Written Opinion dated Nov. 5, 2018 in PCT/CN2018/099989 filed on Aug. 10, 2018.

* cited by examiner

APPARATUS AND MECHANISM TO PERFORM BEAM MANAGEMENT AND BEAM FAILURE RECOVERY IN NR SYSTEM

CROSS REFERENCE TO RELATED APPLICATIONS

This present disclosure claims the benefit of International Application No. PCT/CN2017/096807 filed on Aug. 10, 2017, which is incorporated herein by reference in its entirety.

TECHNICAL FIELD

The disclosure relates generally to wireless communication technology, and more particularly, to beam-formed transmission and reception.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th Generation (5G) wireless communication systems to increase system capacity. Beamforming schemes can be employed to focus transmitted and/or received signal in a desired direction to compensate for path loss of high frequency signals. For example, a base station may employ multiple beams to cover a serving area in a 5G system.

SUMMARY

Aspects of the disclosure provide an electronic device that includes a transceiver and processing circuitry. The transceiver is configured to wirelessly receive a first signal and a second signal from an interface node of a network. The first signal carries control information associated with a wireless link formed between the electronic device and the interface node. The processing circuitry is configured to obtain, at a first protocol layer in a protocol stack, a first signal quality of the first signal and a second signal quality of the second signal. The processing circuitry is configured to determine, at a second protocol layer in the protocol stack, whether the first signal satisfies a beam failure criterion based on the first signal quality. The processing circuitry can identify, at the second protocol layer, the second signal as a candidate beam when the second signal satisfies a candidate beam criterion based on the second signal quality. When the first signal is determined to satisfy the beam failure criterion, the first protocol layer can transmit a request for beam failure recovery (BFR), and monitor a downlink channel associated with the candidate beam to detect a network response from the interface node for the request.

In some example, the processing circuitry is further configured to determine, at the second protocol layer, whether the BFR fails based on a recovery failure criterion, and notify a third protocol layer in the protocol stack when the BFR is determined to have failed.

In some embodiments, the first protocol layer is a physical (PHY) layer in the protocol stack, the second protocol layer is a medium access control (MAC) layer in the protocol stack, and the third protocol layer is a radio resource control (RRC) layer in the protocol stack.

In some embodiments, the processing circuitry is further configured to trigger, at the MAC layer, transmission of the request by receiving a BFR indication from the PHY layer, indicating an uplink channel associated with the candidate beam to transmit the request. The uplink channel is one of: a physical random access channel (PRACH), and a physical uplink control channel (PUCCH). The processing circuitry can transmit, at the PHY layer, the request to the interface node via the uplink channel. Further, the processing circuitry can indicate, from the PHY layer to the MAC layer, whether the network response is received.

In some embodiments, the processing circuitry can initiate, at the MAC layer, a timer when the transmission of the request is triggered. The processing circuitry can determine, at the MAC layer, that the BFR succeeds when the network response is received by the PHY layer before the timer expires. The processing circuitry can determine, at the MAC layer, that the BFR fails when the recovery failure criterion is satisfied. The recovery failure criterion includes at least one of: a number of transmissions of the request reaches a transmission threshold and the network response is not received; and the timer expires and the network response is not received.

In some examples, the processing circuitry is configured to determine, at the RRC, a radio link failure (RLF) when the BFR is determined to have failed, and instruct, by the RRC layer, the PHY layer to apply a default physical layer configuration.

In some examples, the first signal and the second signal include at least one of: a channel specific information-reference signal (CSI-RS) and an synchronization signal block (SSB) transmitted from the interface node. The first signal quality includes at least one of: a beam failure instance when the first signal satisfies the beam failure criterion, reference signal received power (RSRP) of the first signal, and reference signal received quality (RSRQ) of the first signal. The second signal quality includes at least one of: RSRP and RSRQ of the second signal.

In some examples, the processing circuitry is further configured to receive and decode, at the PHY layer, a transport block to form a MAC protocol data unit (PDU). The processing circuitry can extract, at the MAC layer, control information from the MAC PDU. The control information includes a command for beam switching and a second downlink channel from the interface node. The processing circuitry can perform, at the PHY layer, beam switching to update the wireless link based on the second downlink channel.

Aspects of the disclosure provide a method for wireless communication. The method includes wirelessly receiving, by an electronic device, a first signal and a second signal from an interface node of a network. The first signal carries control information associated with a wireless link formed between the electronic device and the interface node. The method includes obtaining, at a first protocol layer in a protocol stack, a first signal quality of the first signal and a second signal quality of the second signal. The method includes determining, at a second protocol layer in the protocol stack, whether the first signal satisfies a beam failure criterion based on the first signal quality, and identifying, at the second protocol layer, the second signal as a candidate beam when the second signal satisfies a candidate beam criterion based on the second signal quality. When the first signal is determined to satisfy the beam failure criterion, the method includes transmitting a request for beam failure recovery (BFR) and monitoring a downlink channel associated with the candidate beam to detect a network response from the interface node for the request.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
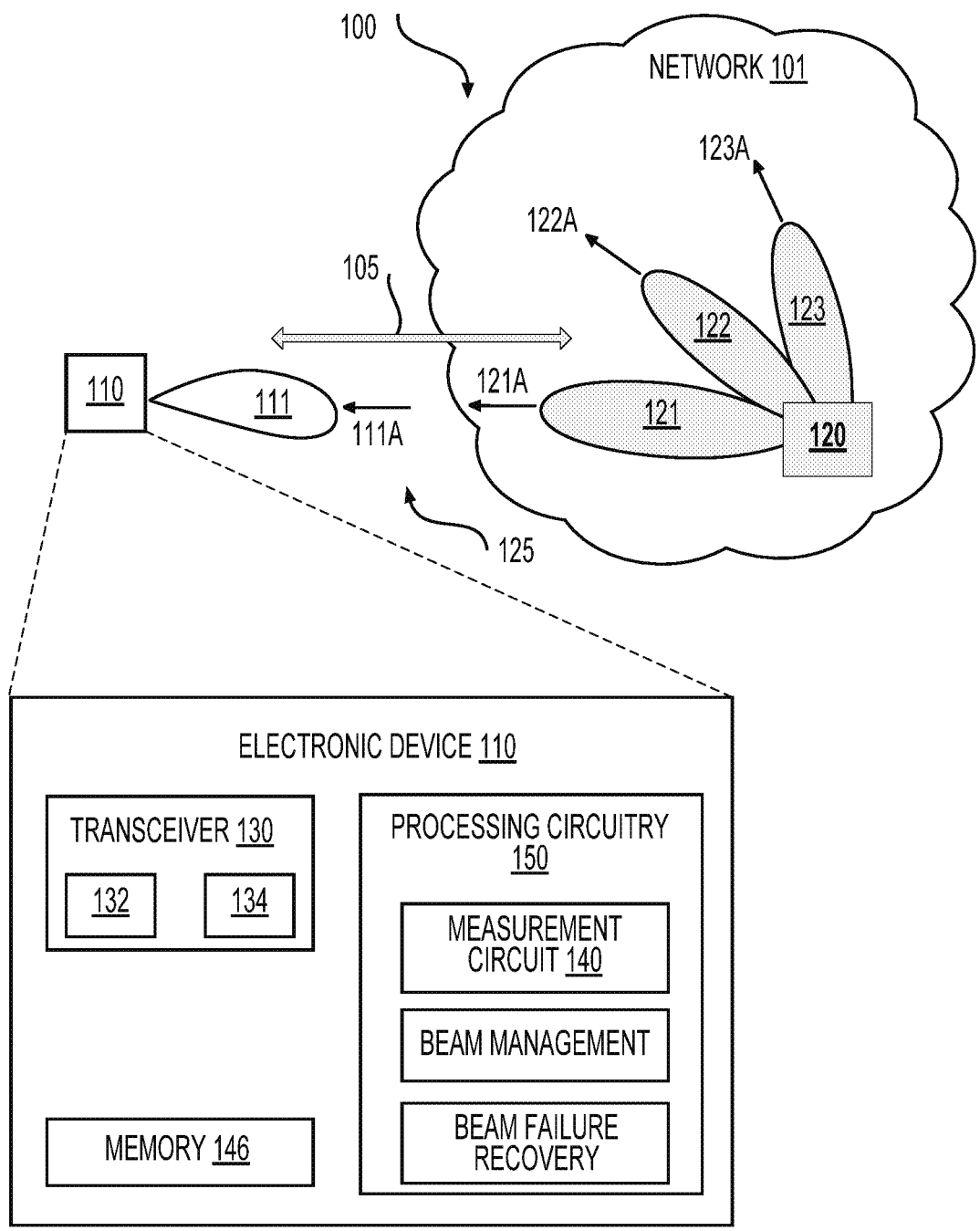
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. In an embodiment, the electronic device 110 communicates wirelessly with an interface node 120 in the network 101 via a wireless link 105 (also referred to as a link 105) associated with a beam 121 transmitted from the interface node 120. In general, a beam is allocated with radio resources including a set of time and/or frequency resources. In some embodiments, a beam is further associated with a direction indicating a dominant propagation direction of signal energy of the beam. For example, beams 121-123 transmitted from the interface node 120 mainly propagate along directions 121A-123A, respectively, thus, are referred to as transmission beams (Tx beams) 121-123 of the interface node 120. In some embodiments, a beam can refer to a signal or a channel transmitted from or received by the electronic device 110 or the interface node 120. In general, beam management, i.e., a set of procedures to acquire and maintain a set of Tx and Rx beams, is implemented to form and maintain a suitable link between the interface node and the electronic device for uplink and downlink transmission/reception. A beam failure occurs when the link is broken, for example, due to beam quality deterioration of one or more beams in the link. Accordingly, a beam failure recovery is implemented to determine a new link associated with, for example, a candidate beam between the electronic device 110 and the interface node 120. The electronic device 110 can include a protocol stack having multiple protocol layers to perform beam management and beam failure recovery. According to aspects of the disclosure, the beam failure recovery is implemented using a first protocol layer (a first layer) and a second protocol layer (a second layer). In some embodiments, the first layer is a Physical (PHY) layer, and the second layer is a Medium Access Control (MAC) layer of the protocol stack.

The network 101 includes various interface nodes, such as the interface node 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, fifth generation (5G) mobile network technology, global system for mobile communication (GSM), long-term evolution (LTE), new radio (NR) technology, and the like. In some examples, the network 101 employs wireless communication technologies developed by the 3rd Generation Partnership Project (3GPP).

In various examples, the interface node 120 is an access point, an access terminal, a base transceiver station (a base station), a Node B, an evolved Node B, a next generation Node B (gNB), and the like. In an example, the interface node 120 is a gNB specified in 5G NR air interface standards developed by 3GPP. The interface node 120 includes hardware components and software components configured to enable wireless communications between the interface node 120 and the electronic device 110. Further, the core nodes include hardware components and software components to form a backbone to manage and control the services provided by the network 101.

In some embodiments, high frequencies, also referred to as millimeter Wave (mmWave) frequencies or FR2 are used as carrier frequencies in the communication system 100 to increase a network capacity. In an example, the high frequencies are higher than 6 gig a-Hertz (GHz), such as between 24-84 GHz. In an example, carrier frequencies less than 6 GHz are referred to as low frequencies, such as between 600 MHz to less than 6 GHz. Signals (or beams) having mmWave frequencies as carrier frequencies, referred to as high frequency (HF) signals, can experience large propagation loss and can be sensitive to blockage. Accordingly, for the HF signals, the interface node 120 and the electronic device 110 can perform beamformed transmission and/or reception to compensate for the propagation loss. In beamformed transmission, signal energy can be focused toward a specific direction, such as directions 121A-123A associated with the Tx beams 121-123. As a result, an increased antenna transmission gain can be achieved in contrast to omnidirectional antenna transmission. Similarly, in beamformed reception, signal energy received from a specific direction can be combined to obtain a higher antenna reception gain in contrast to omnidirectional antenna reception, such as a direction 111A associated with a reception beam (Rx beam) 111 of the electronic device 110. Note that a Tx or Rx beams can also propagate along other directions similar to the direction of the respective beam. For example, the Tx beam 121 propagates predominantly along the direction 121A, however, the Tx beam 121 also propagates along other directions similar to the direction 121A, for example, when the RF wave is not collimated in space.

In various embodiments, the interface nodes 120 is configured to control one or more antenna arrays to form directional beams (Tx or Rx beams) for transmitting or receiving the HF signals. As described above, a directional beam is associated with a direction indicating a dominant propagation direction of signal energy of the directional beam. In some examples, different sets of antenna arrays are distributed at different locations to cover different serving areas. Each such set of antenna arrays can be referred to as a transmission reception point (TRP). A TRP can transmit or receive any suitable number of Tx beams or Rx beams along multiple directions. In FIG. 1 example, the interface node 120 can control a TRP to form directional Tx beams including the Tx beams 121-123 to cover a first cell 125. The Tx beams can be generated simultaneously or in different time intervals. In some embodiments, the interface node 120 can control multiple TRPs to cover multiple cells. In an example, a plurality of electronic devices is served by the interface node 120.

In an embodiment, the electronic device 110 can be any suitable electronic device that can implement beam management and beam failure recovery. In an example, the electronic device 110 is a terminal device (e.g., user equipment) for wireless communication, such as a cell phone, a smart phone, a tablet computer, a laptop, a smart device, a wearable device, and the like. Similarly, the electronic device 110 can employ one or more antenna arrays to generate directional Tx or Rx beams for transmitting or receiving the HF signals. Note that the electronic device 110 and the interface node 120 can also include suitable transceivers and antennas that transmit and receive omnidirectional wireless signals.

In some embodiments, the electronic device 110 can be connected to multiple interface nodes via multiple links, such as in Evolved Universal Terrestrial Radio Access (E-UTRA) NR dual connectivity. For example, the electronic device 110 is connected to the interface node 120 via the link 105 and a second interface node (not shown) via a second link (not shown). In an example, the electronic device 110 is connected to the second interface node using directional Tx/Rx beams, omnidirectional beams, and the like. In an example, the electronic device 110 is connected to the interface node 120 using NR radio access, and to the second interface node using E-UTRA.

Referring to FIG. 1, the electronic device 110 can include a transceiver 130, processing circuitry 150, and a memory 146 that are coupled together, for example, using a bus architecture (not shown). The transceiver 130 is configured to receive and transmit wireless signals. In an example, the transceiver 130 includes a first transceiver 132 that transmits and receives low frequency signals (LF signals), such as omnidirectional wireless signals, and a second transceiver 134 that transmits and receives the HF signals including Tx and Rx beams, such as the Rx beam 111 associated with the link 105. In an example, the link 105 is formed based on the Tx beam 121 and the Rx beam 111 for the electronic device 110 to receive downlink (DL) signals from the interface node 120. In an example, radio resources including time and frequency resources for the Tx beam 121 and Rx beam 111 can be specified, for example, in system information. In an example, the radio resources can be derived based on pre-defined rules. In the FIG. 1 example, a direction 111A of the Rx beam 111 is matched to the direction 121A of the Tx beam 121 by tuning respective antennas of the electronic device 110 and/or the interface node 120.

In an example, the link 105 can be formed based on the Tx beam 121 and an omnidirectional reception beam (not shown) of the electronic device 110. In an example, the link 105 can be formed based on the Rx beam 111 and an omnidirectional transmission beam (not shown) of the interface node 120.

The link 105 can also be used for the electronic device 110 to transmit uplink (UL) signals to the interface node 120 via a Tx beam of the electronic device 110 and a Rx beam of the interface node 120. Further, radio resources for the UL signals, such as the Tx beam of the electronic device 110 can be different from the radio resources used for the DL signals.

Similarly, the radio resources of the UL signals can be specified in system information or can be derived based on pre-defined rules. In an example, directions of the UL signals in the link 105 are opposite to the directions 111A and 121A.

The transceiver 130 is configured to generate electrical signals in response to captured electromagnetic waves by one or more antennas (not shown), process the electrical signals to extract digital streams from the electrical signals. In an example, the transceiver 130 is configured to receive digital streams, such as management frames, data frames, and the like from, for example, the processing circuitry 150, generate radio frequency (RF) signals to carry the digital streams, and cause the one or more antennas to emit electromagnetic waves in the air to transmit wireless signals that carry the digital streams. In an example, the second transceiver 134 causes a TRP to transmit or receive the HF signals, and the first transceiver 132 causes an antenna to transmit or receive the LF signals.

In some embodiments, the transceiver 130 is configured to receive various Tx beams broadcast by the interface node 120 along respective directions, such as the Tx beams 121-122 along the directions 121A-122A, respectively. The received Tx beams include various signals, such as reference signals (RSs) and synchronization signals (SSs) that can be used to estimate beam and link qualities and facilitate beam management and beam failure recovery. RSs can include a channel-state information reference signal (CSI-RS), a periodic CSI-RS, a demodulation reference signal (DMRS), and the like. SSs can include a primary synchronization signal (PSS), a secondary synchronization signal (SSS), and the like. In some embodiments, an SS block (SSB) that includes resources in time and frequency is formed with a PSS, an SSS, and a Physical Broadcast Channel (PBCH). For example, an SSB can include a group of 4 Orthogonal Frequency Division Multiplexing (OFDM) symbols in time domain and 240 subcarriers in frequency domain. In some embodiments, each SSB corresponds to a certain direction, and is transmitted accordingly along the respective direction, such as the direction 121A in the Tx beam 121. In some examples, the interface node 120 transmits multiple SSBs by sequentially sweeping different directions to cover the first cell 125, for example, three SSBs are transmitted along the directions 121A-123A in the Tx beams 121-123, respectively.

CSI-RSs allow the electronic device 110 to estimate beam and link qualities and report Channel Quality Information (CQI) to the interface node 120. Similarly, a CSI-RS includes resources in time and frequency that can be time/frequency offset from respective resources in an SSB. Further, a CSI-RS can include direction information of a corresponding beam. In some examples, information derived from a CSI-RS is used to refine a beam direction to maintain an optimal link between the electronic device 110 and the interface node 120.

In some examples, the transceiver 130 receives signals, such as RSs and SSs from other interface nodes. The received RSs and SSs can be directional beams or omnidirectional beams. Similarly, the received RSs and SSs can be used to estimate beam and link qualities, as described above.

The transceiver 130 is configured to transmit various signals, such as the HF signals and the LF signals. In an embodiment, the transceiver 130 can transmit a beam failure recovery (BFR) request to the interface node 120, for example, using UL physical channels, such as a Physical Random Access Channel (PRACH), a Physical Uplink Control Channel (PUCCH), a NR-PRACH, a NR-PUCCH, and the like in beam failure recovery, as described below.

In some embodiments, the transceiver 130 can transmit a signal carrying information of the BFR request to another interface node connected to the electronic device 110. The other interface node can send the signal to the interface node 120.

In some embodiments, the processing circuitry 150 is configured to perform beam management and beam failure recovery based on a measurement result generated by a measurement circuit 140 in the processing circuitry 150. The measurement circuit 140 is configured to measure quality of signals including the received RSs and SSs to obtain beam quality indicators including reference signal received power (RSRP), reference signal received quality (RSRQ), and the like. In some examples, the measurement circuit 140 can detect a beam failure instance when a beam quality indicator of a respective signal is below a corresponding threshold, and indicate the beam failure instance to the second layer.

In some examples, the measurement circuit 140 is implemented in the first layer. The measurement result that indicates qualities of the received RSs and SSs can be sent from the first layer to the second layer. In various examples, the measurement result includes beam quality indicators, beam failure instances associated with the respective RSs and SSs, and the like. The measurement result can be stored in the memory 146 and is accessible to various layers of the protocol stack including the first layer and the second layer. In an example, the first layer is the PHY layer, and the second layer is the MAC layer.

As described above, beam management refers to a set of procedures to acquire and maintain a set of Tx and Rx beams, thus is used to form and maintain a suitable link between an interface node and an electronic device. Beam management includes beam switching, for example, switching from a present Tx beam transmitted from the interface node 120 with deteriorating beam quality in a link, such as the Tx beam 121 in the link 105, to a new Tx beam having a beam quality that satisfies a certain threshold. In an example, a new link between the electronic device 110 and the interface node 120 is formed based on the new Tx beam. In some embodiments, a beam switching command is embedded in a DL signal transmitted from the network 101, such as from the interface node 120. For example, the transceiver 130 receives a DL signal over a Physical Downlink Shared Channel (PDSCH) from the interface node 120. The processing circuitry 150 obtains the beam switching command embedded in the DL signal, identifies a new beam to form a new link between the electronic device 110 and the interface node 120, and switches to the new beam. According to aspects of the disclosure, the second layer, such as the MAC layer identifies the new beam and indicates the new beam to the first layer, such as the PHY layer. Accordingly, the electronic device 110 can use the new beam to monitor certain DL channels, to obtain system information, control signals, and the like from the interface node 120 via the new link.

As described above, beam failure occurs when a link between an electronic device and an interface node is broken, for example, due to beam quality deterioration of one or more beams associated with the link. Accordingly, the electronic device does not receive control information, such as a beam switching command from the interface node over the link Therefore, the processing circuitry 150 is configured to implement beam failure recovery, for example, to form a new link with a candidate beam. In some embodiments, the processing circuitry 150 detects beam failure based on the measurement result from the measurement circuit 140. For example, beam failure is detected when beam quality of a present beam satisfies a beam failure criterion. Further, the processing circuitry 150 identifies one or more candidate beams that can be used in forming the new link. In various examples, the one or more candidate beams are Tx beams from the interface node 120 and satisfy a candidate beam criterion. According to aspects of the disclosure, the second layer, such as the MAC layer, is configured to obtain the measurement result from the first layer such as the PHY layer, the memory 146, and the like. Further, the second layer is configured to detect beam failure and identify the one or more candidate beams based on the measurement result.

In some embodiments, the processing circuitry 150 generates a beam failure recovery request (a BFR request) to be transmitted to, for example, the interface node 120. The BFR request can include information of the electronic device 110 and the one or more candidate beams. The processing circuitry 150 can implement a BFR request procedure. According to aspects of the disclosure, the BFR request procedure can include BFR request triggering that triggers transmission of the BFR request and BFR request transmission that transmits the BFR request. According to aspects of the disclosure, the second layer, such as the MAC layer, is configured to generate the BFR request and implement the BFR request triggering, for example, to start a BFR timer. Further, the second layer can be configured to select the candidate beam and indicate radio resources, such as a PRACH, a PUCCH, a NR-PRACH, a NR-PUCCH, and the like, for the first layer, such as the PHY layer, to transmit the BFR request.

In some embodiments, the processing circuitry 150 monitors one or more network responses from the interface node 120, for example, on a PDCCH associated with the one or more candidate beams following each transmitted BFR request. The processing circuitry 150 can monitor the network response, for example, during a BFR duration set by the BFR timer. In an example, the processing circuitry monitors a control channel search space for the network response. The processing circuitry 150 determines whether the beam failure recovery is successful based on reception of the network response. In some examples, when the processing circuitry 150 determines that the beam failure recovery is successful, the processing circuitry 150 performs beam switching. In an example, when the processing circuitry 150 determines that the beam failure recovery fails, the processing circuitry declares a Radio Link Failure (RLF), and applies a default physical layer configuration. According to aspects of the disclosure, the second layer, such as the MAC layer, is configured to determine whether the beam failure recovery is successful.

The electronic device 110 can be suitably adapted to perform beam management and beam failure recovery when the new beam used in beam management or the one or more candidate beams used in beam failure recovery are associated with other interface nodes different from the interface node 120. In an example, the electronic device 110 is in dual connectivity with the interface node 120 and the other interface node. Information of the new beam or the one or more candidate beams can be communicated to the interface node 120 via the other interface node that is connected to the electronic device 110 via, for example, omnidirectional signals.

The processing circuitry 150 can be implemented using various techniques, such as integrated circuits, one or more processors executing software instructions, and the like.

The memory 146 can be any suitable device for storing data and instructions to control the operations of the electronic device 110. In an example, the memory 146 stores criteria and instructions associated with beam management and beam failure recovery, and software instructions to be executed by a processor, such as the processing circuitry 150. In an example, the criteria include the beam failure criterion, the candidate beam criterion, various thresholds, such as RSRP thresholds, RSRQ thresholds, and the like. The memory 146 can store various results including the measurement result from the measurement circuit 140.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

Figure 2:
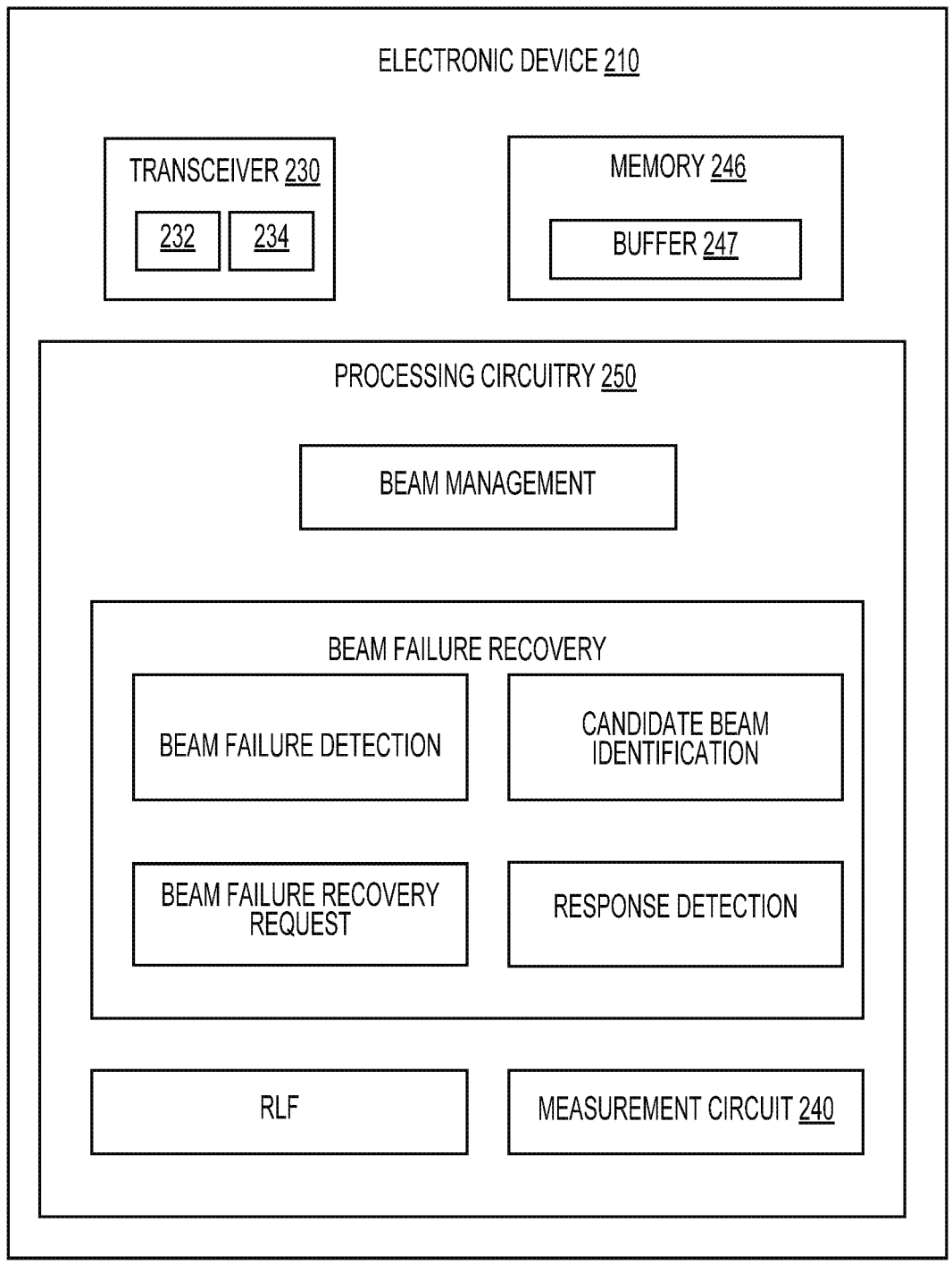
FIG. 2 shows a block diagram of an exemplary electronic device 210 according to an embodiment of the disclosure.

FIG. 2 shows a block diagram of an exemplary electronic device 210 according to an embodiment of the disclosure. The electronic device 210 can be any suitable electronic device that can implement beam management and/or beam failure recovery when the electronic device 210 communicates wirelessly with a wireless service provider network. In an example, the electronic device 110 in the communication system 100 can be implemented using the electronic device 210.

Referring to FIG. 2, the electronic device 210 includes a transceiver 230, processing circuitry 250, and a memory 246 that are coupled together, for example, using a bus architecture (not shown). In some examples, the transceiver 230 further includes a first transceiver 232 and a second transceiver 234. The transceiver 230, the first transceiver 232, and the second transceiver 234 can have identical or similar functions and components as those of the transceiver 130, the first transceiver 132, and the second transceiver 134 shown in FIG. 1, respectively, thus, the description is omitted for purposes of clarity.

The memory 246 can be any suitable device for storing data and instructions. The memory 246 can have identical or similar functions and components as those of the memory 146 shown in FIG. 1, thus, the detailed description is omitted for purposes of clarity. The memory 246 can include the buffer 247 that stores criteria and instructions associated with beam management and beam failure recovery, and software instructions to be executed by a processor, such as the processing circuitry 250. The buffer 247 can store various results including a measurement result from a measurement circuit 240.

The processing circuitry 250 can have identical or similar functions and components as those of the processing circuitry 150 shown in FIG. 1. The processing circuitry 250 can include the measurement circuit 240 that can have identical or similar functions and components as those of the measurement circuit 140 shown in FIG. 1, thus, detailed descriptions are omitted for purposes of clarity.

In an example, the electronic device 110 is implemented using the electronic device 210. Referring to FIG. 1, the electronic device 110 (or 210) is connected to the interface node 120 (or the serving node), via the link 105 associated with the Tx beam 121 and the Rx beam 111. In some embodiments, the measurement circuit 240 measures beam quality of the Tx beam 121 and additional Tx beams from the interface node 120. In some examples, the measurement circuit 240 can measure beam qualities of signals from other interface nodes.

According to aspects of the disclosure, the measurement circuit 240 is implemented in the first layer, such as the PHY layer. The measurement result is sent from the first layer to the second layer, such as the MAC layer. In some examples, the measurement result is stored in the buffer 247 accessible to various layers in the protocol stack.

The processing circuitry 250 can be configured to perform beam management based on the measurement result generated by the measurement circuit 240, similar to that described above in FIG. 1, thus, the description is omitted for purposes of clarity. According to aspects of the disclosure, the second layer, such as the MAC layer, identifies a new beam that is used in beam switching and indicates the new beam to the first layer, such as the PHY layer. Accordingly, the electronic device 210 can use the new beam to monitor certain downlink channels, such as a PDCCH, to obtain control signals from the serving node.

The processing circuitry 250 can be configured to implement beam failure recovery, for example, to form a new link when the present link with the serving node is broken. In some embodiments, the processing circuitry 250 detects beam failure based on the measurement result. For example, beam failure is detected when beam quality of a present beam, such as a RS or an SSB from the serving node, and the like, satisfies the beam failure criterion. In some embodiments, the beam failure criterion includes a beam failure instance threshold, a first RSRP threshold, a first RSRQ threshold, and the like. In some embodiments, the beam failure criterion is satisfied when a number of consecutive beam failure instances reaches the beam failure instance threshold. In some embodiments, the beam failure criterion is satisfied when a number of beam failure instances reaches the beam failure instance threshold in a predefined detection duration. In some examples, the beam failure criterion is satisfied when a beam quality indicator of the present beam is below a respective threshold, such as the first RSRP threshold. In some examples, the beam failure criterion is satisfied when consecutive number of Qout are generated.

In some examples, a beam failure instance occurs when one or more beam quality indicators are below one or more thresholds, such as a first RSRP threshold, a first RSRQ threshold, and the like. The one or more thresholds can be configured by a network (such as the network 101) that provides wireless communication service to the electronic device 210. According to aspects of the disclosure, the second layer can obtain the measurement result from the first layer, the memory 246, and the like. The second layer, such as the MAC layer is configured to detect beam failure based on the measurement result.

In some embodiments, the processing circuitry 250 further implements a self-recovery to avoid frequent implementation of beam failure recovery. In some embodiments, beam failure is determined to be self-recovered when one or more self-recovery events occur for a predefined number of consecutive times. In an example, a self-recovery event occurs when one or more beam quality indicators are above one or more thresholds configured by the network. In some embodiments, beam failure is determined to be self-recovered when one or more recovery events occur in a predefined evaluation period. For example, a self-recovery event is generation of consecutive number of Qin in a pre-defined detection duration reusing current link monitoring procedure based on the measurement result. The evaluation period can be configured by the network.

In some embodiments, the processing circuitry 250 identifies one or more candidate beams for beam failure recovery, for example, to transmit the BFR request to the serving node and to receive a network response from the serving node. In various examples, the candidate beam is associated with a Tx beam of the serving node having beam quality that satisfies the candidate beam criterion. The one or more candidate beams are identified based on the measurement result. For example, the candidate beam criterion is satisfied when RSRP or RSRQ of a CSI-RS or an SSB is above a second RSRP threshold or a second RSRQ threshold. In an example, the first RSRP threshold is identical to the second RSRP threshold, and the first RSRQ threshold is identical to the second RSRQ threshold. In an example, the first RSRP threshold is less than the second RSRP threshold. In an example, the first RSRQ threshold is less than the second RSRQ threshold. In an example, UL radio resources, such as a PUCCH, a PRACH, a NR-PUCCH, a NR-PRACH, configured to transmit the BFR request, is associated with the candidate beam. According to aspects of the disclosure, the second layer, such as the MAC layer, is configured to identify the one or more candidate beams based on the measurement result. In an example, when the received signals such as RSs and SSs fail to satisfy the candidate beam criterion, no candidate beam is identified.

In some embodiments, the processing circuitry 250 generates the BFR request to be transmitted to the serving node. As described above, the BFR request can include information of the electronic device 210, such as an identifier (ID) of the electronic device 210, and whether the one or more candidate beams are identified. When the one or more candidate beams are identified, the BFR request can include information of the one or more candidate beams, such as information of a Tx beam transmitted from the serving node. According to aspects of the disclosure, the second layer, such as the MAC layer is configured to generate the BFR request.

As described above, the processing circuitry 250 can implement a BFR request procedure. According to aspects of the disclosure, the BFR request procedure can include BFR request triggering that triggers the transmission of the BFR request and BFR request transmission that transmits the BFR request. In an embodiment, the BFR request is triggered and transmitted when the beam failure is detected. Accordingly, the BFR request can include information of the electronic device 210 and indicate that no candidate beam is identified. In an embodiment, the BFR request is triggered and transmitted when beam failure is detected and the one or more candidate beams are identified. Accordingly, the BFR request can include information of the electronic device 210 and the one or more candidate beams.

In some examples, when the BFR request is triggered, the processing circuitry 250 starts to transmit the BFR request. In an example, the BFR request is transmitted one or more times to the serving node. In an example, the BFR request can be transmitted to another interface node connected to the electronic device 210, and sent to the serving node via the other interface node. A number of transmissions of the BFR request can be configured by the network, such as a transmission number specifying a maximal number of transmissions of the BFR request. In an example, the processing circuitry 250 starts the BFR timer when the BFR request is triggered, and the number of transmissions of the BFR request is controlled by the BFR duration set by the BFR timer. In an example, the number of transmissions of the BFR request is determined by the BFR duration and the transmission number.

According to aspects of the disclosure, the second layer, such as the MAC layer can be configured to trigger the BFR request including starting the BFR timer, select the candidate beam, and indicate the UL radio resources for the first layer, such as the PHY layer to transmit the BFR request.

The processing circuitry 250 is configured to monitor the network response from the serving node, for example, on a PDCCH associated with the respective candidate beam following each transmitted BFR request. In an example, the processing circuitry 250 can monitor a control channel search space and CORESET for the network response. The processing circuitry 250 can monitor the network response during the BFR duration set by the BFR timer.

In some embodiments, the processing circuitry 250 determines whether the beam failure recovery is successful based on reception of the network response. In one embodiment, the BFR request includes information of the candidate beam, such as a Tx beam from the serving node, thus, informing the serving node to send the network response using the Tx beam. Accordingly, the processing circuitry 250 monitors the network response on the Tx beam. In an example, the processing circuitry 250 receives the network response from the Tx beam, and determines that the beam failure recovery is successful. Accordingly, the processing circuitry 250 performs beam switching.

In some embodiments, a BFR failure can be determined when one or more following conditions are met: a number of transmissions of the BFR request reaches the transmission threshold, and no network response is received; the BFR timer expires and no network response is received; one or more beam failure instances are generated and no candidate beam is identified. According to aspects of the disclosure, the BFR failure is a criterion to declare the RLF. In an embodiment, the processing circuitry 250 declares the RLF for the serving node when the BFR failure is determined and applies a default physical layer configuration. According to aspects of the disclosure, the second layer, such as the MAC layer is configured to determine whether the BFR failure is successful.

Figure 3:
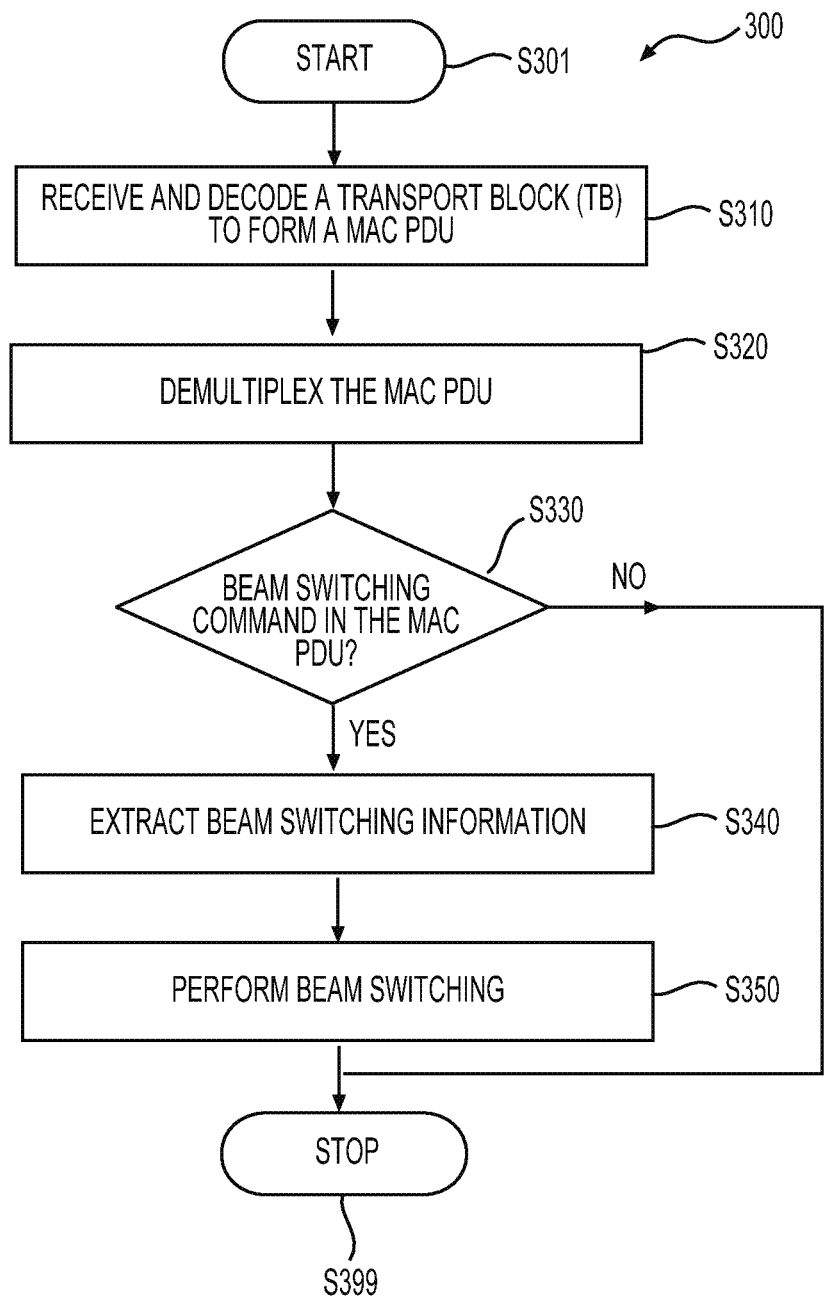
FIG. 3 shows a flow chart of an exemplary process 300 for beam management according to an embodiment of the disclosure.

FIG. 3 shows a flowchart of an exemplary process 300 according to an embodiment of the disclosure. The process 300 can be used to implement beam management, such as beam switching. In an example, an electronic device, such as the electronic device 110 or 210, is configured to perform the process 300. The process 300 starts at S301, and proceeds to S310.

At S310, a transport block (TB) is received and decoded. In an example, a first layer, such as a PHY layer of a protocol stack of the electronic device receives the TB, for example, on a PDSCH from an interface node of a network that serves the electronic device. The first layer decodes the TB to form a MAC Protocol Data Unit (PDU). The MAC PDU is sent from the first layer, to a second layer of the protocol stack. In an example, the second layer can perform a HARQ process on the MAC PDU.

At S320, the MAC PDU is disassembled and demultiplexed by the second layer. In an example, the MAC PDU is determined to include MAC control elements (CEs) where control information is embedded.

At S330, the control information is extracted from the MAC CEs to determine whether a beam switching command is embedded. According to aspects of the disclosure, the second layer extracts the control information, such as from the MAC CEs, and determines whether the beam switching command is embedded in the control information. When the second layer determines that no beam switching command is embedded in the control information, the process 300 proceeds to S399, and terminates. When the second layer determines that the beam switching command is embedded in the control information, the process 300 proceeds to S340.

At S340, beam switching information, such as a target beam for the electronic device to switch to, is extracted from the control information, such as the MAC CE. The beam switching information can include a set of radio resources allocated to the target beam, a direction associated with the target beam, and the like. According to aspects of the disclosure, the second layer extracts and sends the beam switching information to the first layer.

The step S340 described above can be suitably adapted for various applications and scenarios in communication systems. In an embodiment, at S340, the second layer sends the beam switching information to a third protocol layer (a third layer) of the protocol stack. Subsequently, the third layer indicates the first layer to perform the beam switching by sending the beam switching information to the first layer.

In an embodiment, the beam switching information is embedded in an radio resources control (RRC) message. Subsequently, the third layer sends the beam switching information to the first layer.

At S350, beam switching is implemented based on the beam switching information. In an embodiment, the first layer implements beam switching. Accordingly, the electronic device uses the target beam for monitoring PDCCH. The process 300 proceeds to S399, and terminates.

In some embodiments, the first layer is the PHY layer, the second layer is the MAC layer, and the third layer is a RRC layer in the protocol stack.

Figure 4:
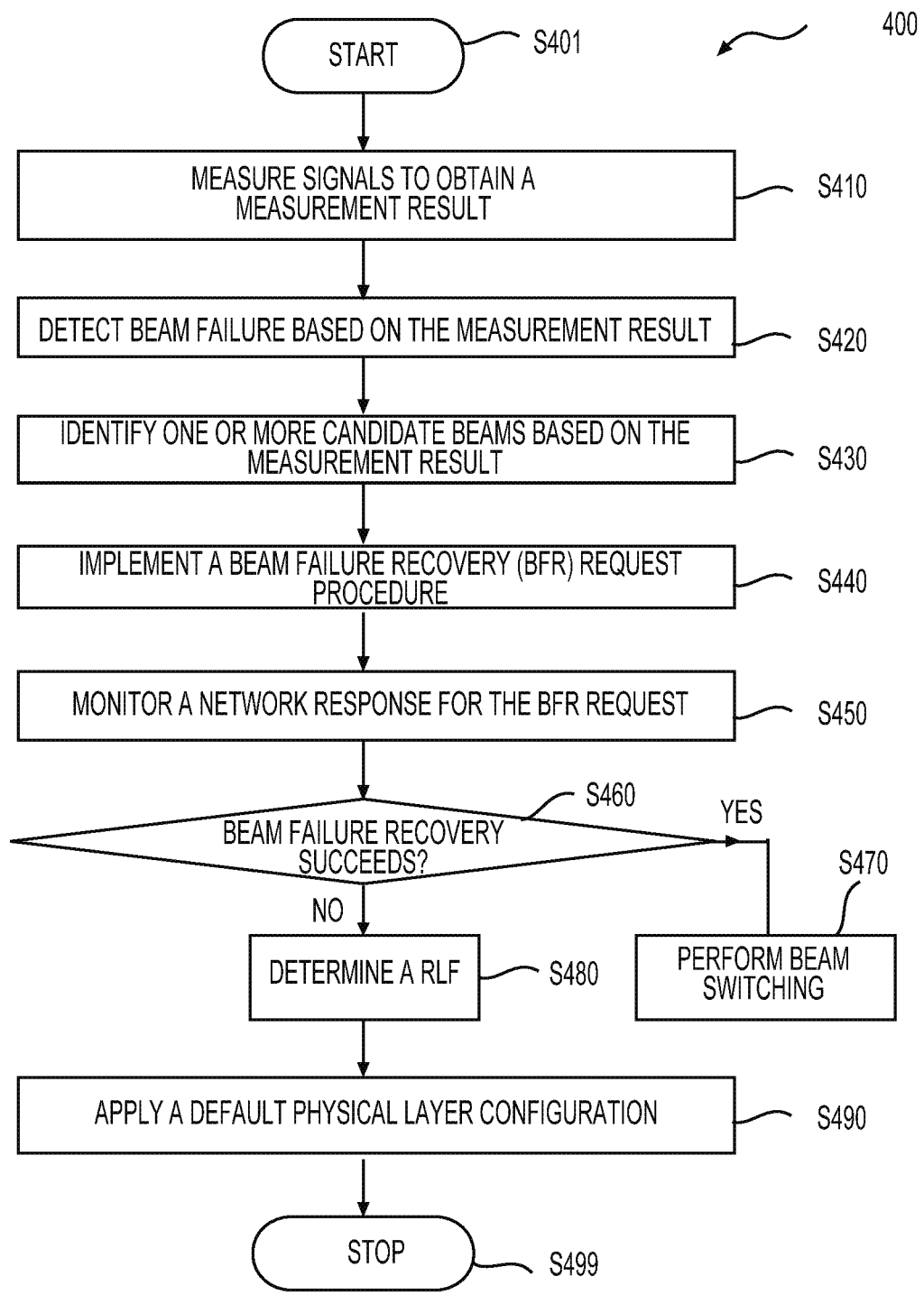
FIG. 4 shows a flow chart of an exemplary process 400 for beam failure recovery according to an embodiment of the disclosure.

FIG. 4 shows a flowchart of an exemplary process 400 according to an embodiment of the disclosure. The process 400 can be used to implement beam failure recovery. In an example, an electronic device, such as the electronic device 110 or 210, is configured to perform the process 400. The process 400 starts at S401, and proceeds to S410.

At S410, signals are measured to obtain a measurement result. As described above, the signals can be RSs and SSs associated with one or more Tx beams such as a CSI-RS, an SSB, and the like, from a serving node connected to the electronic device. The measurement result can include information of beam quality of the respective signals, as described above. In an embodiment, the signals are measured by a first layer of a protocol stack of the electronic device, such as the measurement circuit 140 or 240 in FIGS. 1 and 2.

At S420, beam failure is detected based on the measurement result. According to aspects of the disclosure, a second layer of the protocol stack, is configured to obtain the measurement result from the first layer, a memory in the electronic device, and the like. In some embodiments, beam failure is detected when beam quality of a present beam used in the link satisfies the beam failure criterion, as described above. According to aspects of the disclosure, the second layer detects beam failure.

At S430, one or more candidate beams are identified for beam failure recovery, for example, to transmit a BFR request to the serving node and to receive a network response from the serving node. In various examples, the candidate beam is associated with a Tx beam of the serving node having beam quality that satisfies the candidate beam criterion, as described above. The one or more candidate beams are identified based on the measurement result. In an example, the candidate beam is associated with UL radio resources configured to transmit the BFR request. According to aspects of the disclosure, the second layer is configured to identify the one or more candidate beams. In an example, when the received RSs and SSs fail to satisfy the candidate beam criterion, no candidate beam is identified.

At S440, a BFR request procedure is implemented. In some examples, when beam failure is detected and the one or more candidate beams are identified, a beam failure indication is sent to trigger the BFR request procedure. In some embodiments, a BFR request to be transmitted to the serving node is generated. As described above, the BFR request can include information of the electronic device and whether the one or more candidate beams are identified. The BFR request can include information of the one or more candidate beams. According to aspects of the disclosure, the second layer is configured to generate the BFR request.

In some embodiments, the BFR request procedure can include the BFR request triggering and the BFR request transmission, as described above. In an embodiment, the BFR request is triggered and transmitted when the beam failure is detected. In an embodiment, the BFR request is triggered and transmitted when beam failure is detected and the one or more candidate beams are identified.

In some examples, when the BFR request is triggered, the BFR request is transmitted one or more times to the serving node. In an example, a BFR timer starts when the BFR request is triggered to control the BFR request transmission, as described above. In an example, a beam recovery indication is sent by the second layer to the first layer to transmit the BFR request. In an example, a number of transmissions of the BFR request is determined by the BFR duration, the transmission number, or the combination thereof. According to aspects of the disclosure, the second layer can be configured to trigger the BFR request including starting the BFR timer, select the candidate beam and the radio resources for the first layer to transmit the BFR request.

At S450, a network response, for example, from the serving node for the BFR request is monitored. In some embodiments, the first layer monitors one or more network responses from the serving node, for example, on a PDCCH associated with the respective candidate beam following each transmitted BFR request. In an example, the one or more network responses are monitored during the BFR duration set by the BFR timer. In an example, a control channel search space and CORESET are monitored.

At S460, whether beam failure recovery succeeds is determined. In some embodiments, the second layer determines whether the BFR succeeds based on reception of the network response. In an example, the first layer monitors and receives the network response on a Tx beam from the serving node. In some example, the first layer receives Downlink Control Information (DCI). The first layer indicates to the second layer that the network response is received, and the second layer determines that the beam failure recovery succeeds. In some example, the process 400 proceeds to S470.

In some embodiments, the first layer sends no indication to the second layer, or indicates to the second layer, that no network response is received when one or more of the following conditions are satisfied: a number of transmissions of the BFR request reaches the transmission threshold and no network response is received; the BFR timer expires and no network response is received; one or more Qout indications are generated; and no candidate beam is identified. Accordingly, the second layer determines that beam failure recovery fails, and the process 400 proceeds to S480.

At S470, beam switching is performed. In an example, the first layer implements beam switching.

At S480, the BFR failure is indicated to, for example, a third protocol layer of the protocol stack from the second layer. According to aspects of the disclosure, the BFR failure is a criterion to declare the RLF. In an example, the RLF is declared, for example, by the third layer. Accordingly, a default physical layer configuration is sent to the first layer.

At S490, the default physical layer configuration is applied by the first layer. The process 400 proceeds to S499, and terminates.

The process 400 for beam failure recovery described above can be suitably adapted for various applications and scenarios in communication systems. For example, various alternative embodiments are described below by referring to steps S410-S490 in FIG. 4. It is apparent that additional modifications can be made to the process as needed for various applications and scenarios in communication systems.

In an embodiment, a process 400A includes steps S420-S470 that are implemented at or by the first layer. The process 400A includes S490 that is identical to that in the process 400. In addition, modifications are made to steps S440, S460, and S480. At S440, sending the beam recovery indication to the first layer is omitted. At S460, indicating, by the first layer to the second layer that the DL response is received or not is omitted. At S480, the beam failure recovery failure is indicated to the third layer from the first layer.

In an embodiment, a process 400B includes steps S420-S490 where the steps S450, and S470-S490 are identical. The steps S420-S430 are implemented at or by the first layer. At S440, the beam failure indication is sent, from the first layer to the second layer to trigger the BFR request procedure. Further, information of the one or more candidate beams is sent from the first layer to the second layer. S460 is implemented by the first layer. Further, at S460, indicating, by the first layer to the second layer that the DL response is received or not is omitted.

In an embodiment, a process 400C includes steps S410-S490 where the steps S410, S450, S470, and S490 are identical or similar. The steps S420, S430, S460, and S480 are implemented at or by the third layer. At S440, the BFR triggering is performed by the third layer, and the BFR transmission is performed by the first layer. Further, at S460, indicating, by the first layer to the third layer that the DL response is received or not.

In an embodiment, a process 400D includes steps S420-S490 where the steps S450, S470, and S490 are identical or similar. The steps S420-S430, and S460 are implemented at or by the first layer. Further, at S460, indicating, by the first layer to the third layer that the DL response is received or not. At S440, the BFR triggering is performed by the third layer, and the BFR transmission is performed by the first layer.

In some embodiments, the first layer is the PHY layer, the second layer is the MAC layer, and the third layer is the RRC layer in the protocol stack.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays, (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. An electronic device, comprising:
a transceiver configured to wirelessly receive a first signal and a second signal from an interface node of a network, the first signal carrying control information associated with a wireless link formed between the electronic device and the interface node, the first signal and the second signal including at least one of: a channel specific information-reference signal (CSI-RS) and an synchronization signal block (SSB) transmitted from the interface node; and
processing circuitry configured to:
    obtain, at a first protocol layer in a protocol stack, a first signal quality of the first signal and a second signal quality of the second signal;
    determine, at a second protocol layer in the protocol stack, whether the first signal satisfies a beam failure criterion based on the first signal quality;
    identify, at the second protocol layer, the second signal as a candidate beam when the second signal satisfies a candidate beam criterion based on the second signal quality; and
    when the first signal is determined to satisfy the beam failure criterion, the first protocol layer:
        transmits a request for beam failure recovery (BFR); and
        monitors a downlink channel associated with the candidate beam to detect a network response from the interface node for the request, wherein
    the first signal quality includes at least one of: a beam failure instance when the first signal satisfies the beam failure criterion, reference signal received power (RSRP) of the first signal, and reference signal received quality (RSRQ) of the first signal, and the second signal quality includes at least one of: RSRP and RSRQ of the second signal.

2. The electronic device according to claim 1, wherein the processing circuitry is further configured to:
determine, at the second protocol layer, whether the BFR fails based on a recovery failure criterion; and
notify a third protocol layer in the protocol stack when the BFR is determined to have failed.

3. The electronic device according to claim 1, wherein:
the first protocol layer is a physical (PHY) layer in the protocol stack; and
the second protocol layer is a medium access control (MAC) layer in the protocol stack.

4. The electronic device according to claim 2, wherein:
the first protocol layer is a PHY layer in the protocol stack;
the second protocol layer is a MAC layer; and
the third protocol layer is a radio resource control (RRC) layer in the protocol stack.

5. The electronic device according to claim 4, wherein the processing circuitry is further configured to:
trigger, at the MAC layer, transmission of the request by sending a BFR indication to the PHY layer, indicating an uplink channel associated with the candidate beam to transmit the request, the uplink channel being one of: a physical random access channel (PRACH), and a physical uplink control channel (PUCCH); and
transmit, at the PHY layer, the request to the interface node via the uplink channel.

6. The electronic device according to claim 5, wherein the processing circuitry is further configured to:
indicate, from the PHY layer to the MAC layer, whether the network response is received.

7. The electronic device according to claim 6, wherein the processing circuitry is configured to:
initiate, at the MAC layer, a timer when the transmission of the request is triggered;
determine, at the MAC layer, that the BFR succeeds when the network response is received by the PHY layer before the timer expires; and
determine, at the MAC layer, that the BFR fails when the recovery failure criterion is satisfied, the recovery failure criterion including at least one of: a number of transmissions of the request reaches a transmission threshold and the network response is not received; and the timer expires and the network response is not received.

8. The electronic device according to claim 4, wherein the processing circuitry is configured to:
determine, at the RRC, a radio link failure (RLF) when the BFR is determined to have failed; and
instruct, by the RRC layer, the PHY layer to apply a default physical layer configuration.

9. The electronic device according to claim 3, wherein the processing circuitry is further configured to:
receive and decode, at the PHY layer, a transport block to form a MAC protocol data unit (PDU);
extract, at the MAC layer, control information from the MAC PDU, the control information including a command for beam switching and a second downlink channel from the interface node; and
perform, at the PHY layer, beam switching to update the wireless link based on the second downlink channel.

10. A method for wireless communication, comprising:
wirelessly receiving, by an electronic device, a first signal and a second signal from an interface node of a network, the first signal carrying control information associated with a wireless link formed between the electronic device and the interface node, the first signal and the second signal including at least one of: a channel specific information-reference signal (CSI-RS) and an synchronization signal block (SSB) transmitted from the interface node;
obtaining, at a first protocol layer in a protocol stack, a first signal quality of the first signal and a second signal quality of the second signal;
determining, at a second protocol layer in the protocol stack, whether the first signal satisfies a beam failure criterion based on the first signal quality;
identifying, at the second protocol layer, the second signal as a candidate beam when the second signal satisfies a candidate beam criterion based on the second signal quality; and
when the first signal is determined to satisfy the beam failure criterion,
transmitting a request for beam failure recovery (BFR); and
monitoring a downlink channel associated with the candidate beam to detect a network response from the interface node for the request, wherein
the first signal quality includes at least one of: a beam failure instance when the first signal satisfies the beam failure criterion, reference signal received power (RSRP) of the first signal, and reference signal received quality (RSRQ) of the first signal, and
the second signal quality includes at least one of: RSRP and RSRQ of the second signal.

11. The method according to claim 10, further comprising:
determining, at the second protocol layer, whether the BFR fails based on a recovery failure criterion; and
notifying a third protocol layer in the protocol stack when the BFR is determined to have failed.

12. The method according to claim 10, wherein the first protocol layer is a PHY layer in the protocol stack and the second protocol layer is a MAC layer in the protocol stack.

13. The method according to claim 11, wherein the first protocol layer is a PHY layer in the protocol stack, the second protocol layer is a MAC layer in the protocol stack, and the third protocol layer is an RRC layer in the protocol stack.

14. The method according to claim 13, further comprising:
triggering, at the MAC layer, transmission of the request by sending a BFR indication to the PHY layer, indicating an uplink channel associated with the candidate beam to transmit the request, the uplink channel being one of: a PRACH and a PUCCH; and
transmitting, at the PHY layer, the request to the interface node via the uplink channel.

15. The method according to claim 14, further comprising:
indicating, from the PHY layer to the MAC layer, whether the network response is received.

16. The method according to claim 15, further comprising:
initiating, at the MAC layer, a timer when the transmission of the request is triggered;
determining, at the MAC layer, that the BFR succeeds when the network response is received by the PHY layer before the timer expires; and
determining, at the MAC layer, that the BFR fails when the recovery failure criterion is satisfied, the recovery failure criterion including at least one of: a number of transmissions of the request reaches a transmission threshold and the network response is not received; and the timer expires and the network response is not received.

17. The method according to claim 13, further comprising:
determining, at the RRC layer, a RLF when the BFR is determined to have failed; and
instructing, by the RRC layer, the PHY layer to apply a default physical layer configuration.

18. The method according to claim 12, further comprising:
receiving and decoding, at the PHY layer, a transport block to form a MAC protocol data unit (PDU);
extracting, at the MAC layer, control information from the MAC PDU, the control information including a command for beam switching and a second downlink channel from the interface node; and
performing, at the PHY layer, beam switching to update the wireless link based on the second downlink channel.

* * * * *